United States Patent

[11] 3,630,620

[72] Inventor George E. Fackler
Louisville, Ky.
[21] Appl. No. 838,626
[22] Filed July 2, 1969
[45] Patented Dec. 28, 1971
[73] Assignee Xerox Corporation
Rochester, N.Y.

[54] PLATEN COVER FOR COPYING MACHINES
4 Claims, 3 Drawing Figs.
[52] U.S. Cl.................................................. 355/76,
355/82, 355/93, 355/118, 355/129
[51] Int. Cl...................................................G03b 27/62,
G03b 27/64
[50] Field of Search.......................................... 355/3, 8,
25, 75, 76, 82, 93, 118, 129

[56] References Cited
UNITED STATES PATENTS
2,198,251  4/1940  Jackson........................ 355/118

Primary Examiner—Samuel S. Matthews
Assistant Examiner—Richard A. Wintercorn
Attorneys—Norman E. Schrader, James J. Ralabate and Frederick E. McMullen ABSTRACT: A foldable cover for the platen of a copying machine which when closed shields the user against glare and holds the document being copied still without adverse image pickup. The cover consists of a pair of opaque, substantially equal sized members hinged together edge to edge in an assembly, the cover members being foldable one upon the other during storage. The cover assembly itself is hingedly supported adjacent the platen for combined swinging and lifting movement over and off from the platen and any document resting thereon.

INVENTOR.
GEORGE E. FACKLER

ATTORNEY

PLATEN COVER FOR COPYING MACHINES

This invention relates to document copying machines, more particularly, to a foldable cover for the platen of such copying machines.

In document copying machines, such as xerographic machines, it is important to shield the user's eyes from the glare attending operation of such machines. This objective is becoming increasingly important as the intensity of illumination in newer, more modern high speed copying machines becomes greater and greater. In this respect, there is rising concern in medical circles that exposure to high intensity light, even if only for a few microseconds, may result in permanent damage to the eyesight. In addition, it is usually desirable to locate and hold the document being copied, such as a letter, stationary during the copy cycle, or at least during the scanning portion of that cycle, to prevent blurring or smearing of the image. At the same time, since manual operation by the machine user is envisioned, the combined shield and document holder or cover must be both easy and foolproof to handle.

It is the principle object of the present invention to provide a new an improved cover for the platens of document copying machines.

It is the further object of the present invention to provide a foldable cover for the transparent platen of a copying machine adapted to shield the user's eyes from unwarranted glare while holding the document being copied against movement.

It is an object of the present invention to provide a bifold platen cover for copiers adapted to protect the operator's eyes against glare and to obviate motion of the document during the copying process.

It is an object of the present invention to provide a simple, foolproof, and economical cover for copying machine platens.

It is an object of the present invention to provide a foldable platen cover for copiers incorporating means to provide automatic adjustment of the cover in accommodation of various thickness documents being copied.

This invention relates to a cover for document copying apparatus having a platen on which documents to be copied are placed, the combination of, a cover for the platen, first hinge means for rotatably supporting the cover adjacent the platen to enable the cover selectively to be swung into and out of covering relationship with the platen and any document placed thereon; the cover including a pair of opaque members sized so that when disposed side by side the members combine to form a covering surface at least as large as the platen; and second hinge means for joining the member sides together so that on swinging of the cover out of covering relationship with the platen, the members to fold inwardly one upon the other, whereby to facilitate storing of the cover.

Other objects and advantages of the present invention will be apparent from the ensuing description and drawings, in which.

Figure 1:
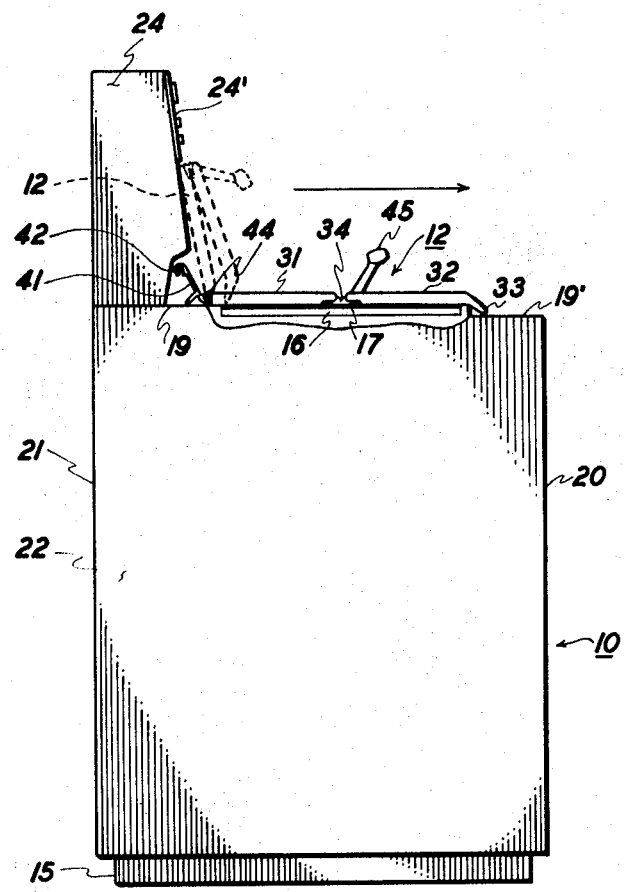
FIG. 1 is a side view partially in section showing the platen cover of the present invention unfolded over the platen.

Referring to the drawings there is shown a copying or reproduction machine, designated generally by the numeral 10, incorporating the platen cover 12 of the present invention. Copying machine 10 comprises any suitable apparatus such as a xerographic copier adapted to make one or more copies of a document, letter, book, etc. As may be understood, copiers of this type normally have a transparent or glass surface 16, usually referred to as a platen, upon which the document being copied rests, and through which the document 17 is viewed or seen by the copier.

As is known to those familiar with the art, document copying machine normally employ a high intensity illumination source or light, which may be a flash (not shown), to illuminate through the transparent platen 16, the side of the document being copied. As will appear, cover 12 serves to cover the platen 16 and the document 17 resting thereon during the copying process to obviate strain or injury to the eyes of persons standing nearby, normally the operator. In addition, the cover 12 serves to hold the document still during the copying cycle to prevent any blurring of the image.

Copying machine 10 includes a suitable housing 15 having front, rear, and side walls 20, 21, and 22 respectively with a substantially horizontal tablelike top 19. The front or forward area of top 19 may be stepped down at 19'. As is understood, a portion of top 19 is comprised of platen 16, it being advantageous to have the platen 16 horizontal or nearly horizontal to facilitate positioning and holding of the document being copied thereon. However, it is understood that platen 16 may be angled with respect to the horizontal, and cover 12 and/or other suitable retaining means provided to hold the document being copied stationary. In the exemplary machine shown, a control housing 24 is provided adjacent the back of the machine 10, the rear of control housing 24 being flush with rear wall 21 of housing 15.

While the document supporting platen 16 may be any suitable shape, normally platen 16 is rectangular or square to correspond with conventional document shapes. In the exemplary copying machine 10, platen 16 is disposed in front of control housing 24 with the inside edge of platen 16 adjacent to and paralleling the front face 24' of housing 24. The outside or front edge of platen 16 terminates adjacent stepped portion 19' of top 19.

Cover 12 comprises a pair of substantially equal sized rectangular platelike members 31, 32 hinged together along an adjoining side by hinge 34. Hinge 34 is arranged so that members 31, 32 pivot or fold about the inside edge of one another, Members 31, 32 are dimensioned so that members 31, 32, when unfolded to the solid line position shown in FIG. 1 overlay or cover the entire platen 16. Preferably, the front cover member 32 incorporates downwardly inclined front edge portion 33 adapted, when cover 12 is unfolded from the storage or dotted line position of FIG. 1 over thin documents, to project into the stepped area 19' below the level of platen 16. The cover front edge 33 serves to protect anyone standing in front of the copying machine 10, normally the operator, against direct glare from the machine illumination source, particularly where relatively thick documents such as books are copied (note FIG. 3).

Cover members 31, 32 may be formed from any suitable opaque material such as metal, plastic, rubber, etc., or combinations thereof. Hinge 34, which extends along the length of the adjoining sides of members 31, 32, is preferably of a design which forecloses light emissions when in the unfolded state.

The cover 12 is appended to copying machine 10 through an elongated double hinged support bracket 41. Support bracket 41 is rotatably supported by pins 42 in control housing 24, such that the axis of rotation of bracket 41 is above the surface of platen 16. The inside edge of rear cover member 31 is hinged to the opposite edge of bracket 41 by suitable hinge means 44. A handle 45 may be provided to facilitate raising and lowering of cover 12.

Figure 2:
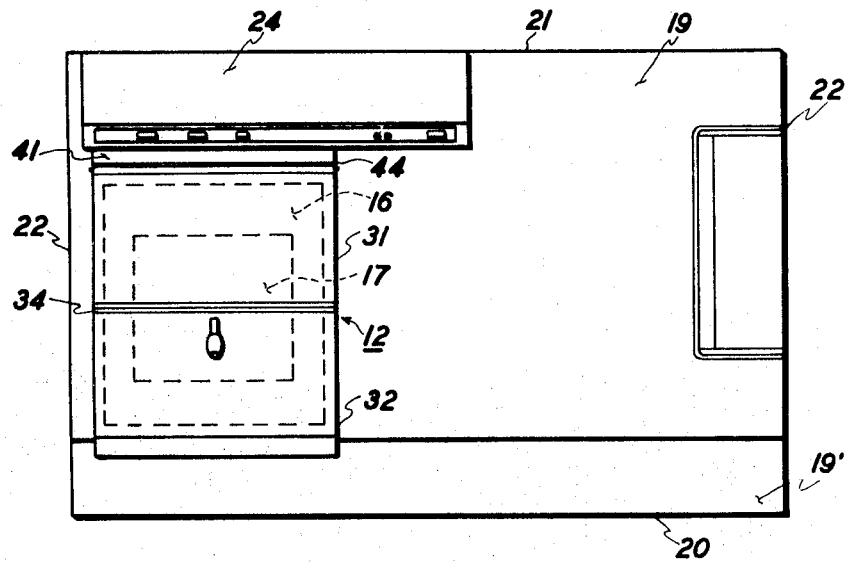
FIG. 2 is a top plan view of the platen cover shown in FIG. 1.

With cover 12 in the dotted line position shown in FIG. 1, a document to be copied, such as paper 17, may be placed face down on the exposed platen 16. Handle 45 of cover 12 is then grasped and the cover pulled forward (in the direction of the arrow in FIG. 1). As cover 12 swings forward about hinge 44, the cover members 31, 32 pivot outwardly or unfold about hinge 34. Accordingly, cover 12 unfolds outwardly and downwardly over platen 16 and the document 17 resting thereon to substantially the position shown in solid lines in FIGS. 1 and 2 of the drawing.

Figure 3:
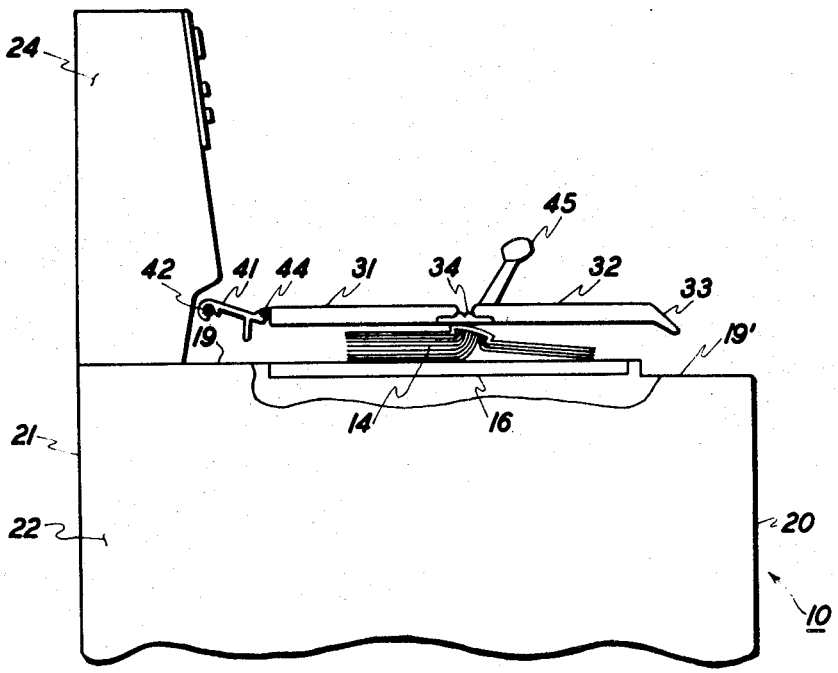
FIG. 3 is a side view partially in section showing the platen cover of the present invention unfolded in a raised position over the platen.

At the completion of the copy cycle, cover 12 is raised by grasping handle 45 and exerting a lifting and pushing movement which swings the cover 12 upwardly from platen 16 about hinge 44 while folding the cover members 31, 32 upon one another about hinge 34. Cover 12 is accordingly returned to the dotted line position of FIG. 1, and platen 16 uncovered to permit removal of the document therefrom. In the aforedescribed use, that is, copying of single sheet documents or relatively thin multisheet documents, support bracket 41 normally remains in the position shown in FIG. 1.

Where relatively thick documents such as book 14 shown in FIG. 3 are to be copied, the outward or unfolding movement of the cover members 31, 32 with concurrent downward swinging movement thereof about hinge 44 is accompanied by an upward swinging movement of the entire cover 12 together with bracket 41 about pins 42. This latter movement about pins 42 effectively raises or lifts cover 12 to a height necessary to enable cover members 31, 32 to unfold completely over the book 14 as shown in FIG. 3. This is necessary in order to assure that the platen 16 is completely covered and to prevent any imaging of the juncture point between cover members 31, 32 as could result where members 31, 32 are not completely unfolded.

While the invention has been described with reference to the structure disclosed herein, it is not confined to the details set forth; but is intended to cover such modifications, or changes as may come within the scope of the following claims.

What is claimed is:

1. In a document copying apparatus of the type having a platen on which documents to be copied are placed, the combination of:
   a cover for said platen;
   first hinge means for rotatably supporting said cover adjacent said platen to enable said cover selectively to be swung into and out of covering relationship with said platen and any document placed on said platen;
   said cover including a pair of generally rectangular opaque members sized so that when disposed side by side the inside surfaces of said members combine to form a covering surface at least as large as said platen; and
   second hinge means for connecting the adjoining sides of said members together, each of said member adjoining sides having an inside corner edge and an outside corner edge, said second hinge means comprising at least one hinging element operatively connected between said inside corner edges so that on swinging of said cover out of covering relationship with said platen said members fold inwardly one upon the other whereby to facilitate storing of said cover.

2. In a document copying apparatus of the type having a substantially rectangularly shaped platen with front and rear sides on which documents to be copied are placed, the combination of:
   a cover for said platen;
   first hinge means for rotatably supporting said cover adjacent said platen to enable said cover selectively to be swung into and out of covering relationship with said platen and any document placed on said platen;
   said cover including a pair of opaque members sized so that when disposed side by side said members combine to form a covering surface at least a as large as said platen; and
   second hinge means for joining said member sides together so that on swinging of said cover out of covering relationship with said platen said members fold inwardly one upon the other whereby to facilitate storing of said cover,
   said covering being substantially rectangular with front and rear edges corresponding to said platen front and rear sides, the dimension of said cover across said cover front and rear edges when unfolded being greater than the dimension across said platen front and rear sides such that said cover front edge projects beyond said platen front side;
   said first hinge means supporting said cover for rotation adjacent said platen rear side;
   the portion of said cover front edge projecting beyond said platen front side extending downwardly whereby on unfolding of said cover over said platen, said cover front edge overlays said platen front side.

3. The apparatus according to claim 1 including means supporting said first hinge means for limited lifting movement above said platen whereby to enable said cover to unfold at a level above said platen.

4. In a document copying apparatus of the type having a platen on which documents to be copied are placed, the combination of:
   a cover for said platen;
   first hinge means for rotatably supporting said cover adjacent said platen to enable said cover selectively to be swung into and out of covering relationship with said platen and any document placed on said platen;
   said cover including a pair of opaque members sized so that when disposed side by side said members combine to form a covering surface at least as large as said platen;
   second hinge means for joining said member sides together so that on swinging of said cover out of covering relationship with said platen said members fold inwardly one upon the other whereby to facilitate storing of said cover; and
   means supporting said first hinge means for limited lifting movement above said platen whereby to enable said cover to unfold at a level above said platen, said first hinge supporting means including third hinge means mounted on said apparatus adjacent said platen; and an intermediate support element operatively connecting said first hinge means with said third hinge means whereby to enable said first hinge means with said cover to turn about said third hinge means to permit unfolding of said cover at a level above said platen.

* * * * *